US008423492B2

(12) United States Patent
Hodgin

(10) Patent No.: US 8,423,492 B2
(45) Date of Patent: Apr. 16, 2013

(54) PREDICTIVE PROMPTING AND DECISION OUTCOME

(75) Inventor: Charles Reed Hodgin, Westminster, CO (US)

(73) Assignee: AlphaTRAC, Inc., Westminster, CO (US)

( * ) Notice: Subject to any disclaimer, the term of this patent is extended or adjusted under 35 U.S.C. 154(b) by 584 days.

(21) Appl. No.: 12/686,301

(22) Filed: Jan. 12, 2010

(65) Prior Publication Data

US 2010/0179928 A1 Jul. 15, 2010

Related U.S. Application Data

(60) Provisional application No. 61/144,103, filed on Jan. 12, 2009.

(51) Int. Cl.
*G06F 17/00* (2006.01)
*G06F 9/68* (2006.01)

(52) U.S. Cl.
USPC .............................. 706/45; 382/226

(58) Field of Classification Search ................ None
See application file for complete search history.

(56) References Cited

U.S. PATENT DOCUMENTS

2005/0004823 A1* 1/2005 Hnatio ............................. 705/7
2007/0022079 A1* 1/2007 Benson et al. .................. 706/59
2007/0129927 A1* 6/2007 Chussil et al. ................. 703/16

* cited by examiner

*Primary Examiner* — Alan Chen
(74) *Attorney, Agent, or Firm* — HolzerIPLaw, PC

(57) ABSTRACT

A system and method that provide for decision support and/or training support in crisis decision-making situations are provided. In one implementation, for example, a method identifies patterns from known cases based on information from a crisis event. Each of the known cases includes attributes and at least one outcome. The method also identifies a first subset of the known cases that relate to the identified patterns from the known cases. The method also analyzes the identified patterns to determine a cue that, if answered, will provide a second subset of the known cases including a more converged range of decision outcomes than the first subset.

24 Claims, 12 Drawing Sheets

AlphaACT: Recognize Screen

User has characterized the event with initial event information

Now the program displays the top matching options from the knowledge base and requests more information to converge the range of results.

AlphaACT: Recognize Screen, focus on knowledge base.

The knowledge base displays a list of possible events.

The events listed are the top pattern matches based on the current input of information.

| Indicator | Select | Select | Select | Select | Select |
|---|---|---|---|---|---|
| Event | Crash | Crash | Crash | Crash | Crash |
| Weather (Stability / wind speed [mph]) | D/20 mph - Day/night, strong wind | D/20 mph - Day/night, strong wind | D/20 mph - Day/night, strong wind | D/20 mph - Day/night, strong wind | D/20 mph - Day/night, strong wind |
| Terrain Type | Rural | Rural | Rural | Rural | Rural |
| Substance | Diborane(6) | Fluorine | Silane | Chlorine | Tungsten hexafluoride |
| Physical State | Gas | Gas | Gas | Gas | Gas |
| Container Type | 7 x 33 | 9 x 51 | 9 x 51 | truck tank | 4 x 27 |
| Number Of Containers | 4 | 1 | 4 | 7 | 1 |
| Casualty (Protective Action) Zone (ft) | 899 | 156 | 8136 | 262467 | 0 |
| Fatality (Isolation) Zone (ft) | 436 | 0 | 423 | 46588 | 0 |

AlphaACT: Characterize Screen, focus on Map

Map display shows the Casualty (Protection Action) Zone and the Fatality (Isolation) Zone based up the range of zones displayed in case scenarios.

Figure 10    Top-level conceptual software design decision engine subsystems

PREDICTIVE PROMPTING AND DECISION OUTCOME

CROSS-REFERENCE TO RELATED APPLICATIONS

The present application claims benefit of priority to U.S. Provisional Patent Application No. 61/144,103 entitled "Crisis Decision Support System" and filed by Charles Reed Hodgin on Jan. 12, 2009, specifically incorporated by reference herein for all that it discloses or teaches.

GOVERNMENT RIGHTS

This invention was made with Government support under W31P4Q-09-C-0098 and W31P4Q-08-C-0106 awarded by the United States Army. The Government has certain rights in the invention.

BACKGROUND

In a rational choice decision making process, a decision maker gathers all options and all information pertinent to those options, evaluates each of the options based on the gathered information, rank orders the options based on a value system, and selects the best of all possible options based on the ranking. In a crisis, however, the rational choice decision process is usually ineffective. There is typically not enough time, not enough information to characterize each of the options, and the options themselves are continuously changing. A decision maker typically cannot catch up to changing circumstances, keep track of those changes, and perform all the steps within the time frame allotted by the circumstances.

A recognition-primed decision process (an example of a naturalistic decision making framework), however, can be used effectively in a crisis. The recognition-primed decision process focuses on recognition changes in a situation to initiate decision-making, as opposed to conventional analytical approaches. In a recognition-primed decision process, a decision maker identifies and quickly selects limited information from what is available. The decision maker compares that information to scenarios in his or her personal knowledge base acquired over years of training and experience and identifies an option that is "good enough" to start working on the crisis. The decision maker then continually re-evaluates the good enough option in light of changing circumstances. If the option no longer matches the conditions in the current crisis, the decision maker rejects the option and seeks another "good enough" option from his or her personal knowledge base, and continues making decisions in response to the crisis based on the new option.

SUMMARY

A system and method that provide for decision support and/or training support in crisis decision-making situations are provided.

In one implementation, a method is provided that identifies patterns from known cases based on information from a crisis event. Each of the known cases includes attributes and at least one outcome. An attribute, for example, may represent specific known data about a known case that was important to the outcome of that case. An attribute may also represent a conclusion from specific known data, a category or characteristic of the data, a decision made in a known case, a quality of the decision made, a quality of the outcome of the known case, or the like.

The method also identifies a first subset of the known cases that relate to the identified patterns from the known cases. As used herein, a known case is related to the identified patterns if there is a significant relationship between attributes of the known case and the identified patterns. In one implementation, for example, the relationship between the attributes of the known case and the identified patterns may be determined to the extent to which the attributes of the known case match the identified patterns that were identified based on information for a crisis event. The method also analyzes the identified patterns to determine a cue that, if answered, will provide a second subset of the known cases including a more converged range of decision outcomes than the first subset.

In one implementation, the information for the crisis event comprises initial size up information for the crisis event.

In another implementation, the method may iteratively identify new cues that will further converge a range of decision outcomes and identify refined additional subsets based on an answer to the determined cues. In one implementation, for example, a method comprises gathering information related to the determined cue and identifying revised patterns from the known cases based on the gathered information related to the determined cue. In this implementation, the method further identifies a third subset of the known cases that relate to the revised patterns. In addition, the method re-analyzes the revised patterns to determine a second cue that, if answered, will provide a fourth subset of known cases with a more converged range of decision outcomes than the third subset.

In another implementation, the method uses a pattern recognition engine to identify patterns and subsets of known cases. The method may also use a pattern recognition engine to analyze the patterns to determine a converging cue.

In yet another implementation, a system for providing predictive prompts for decision-making is provided. The system comprises a pattern recognition engine that is configured to store attributes for a plurality of known cases each comprising attributes and at least one outcome, identify a first subset of the known cases that relate to patterns identified from the known cases based on information for a crisis event, and analyze the patterns to determine a cue that, if answered, will provide a second subset of known cases with a more converged range of decision outcomes than the first subset.

In one implementation, the pattern recognition engine comprises an artificial intelligence engine. The artificial intelligence engine, for example, may comprise a neural network including a plurality of nodes corresponding to attributes of the known cases.

A computer-readable storage media that stores computer executable instructions for executing on a computer system a process that provides predictive prompts for decision-making is also provided.

Other implementations are also described and recited herein.

BRIEF DESCRIPTION OF THE DRAWINGS

FIG. 8 illustrates a close up view of a second portion of the user interface shown in FIG. 6.

DETAILED DESCRIPTIONS

In one implementation of the disclosed technology, a crisis decision support and training system is provided. A crisis situation or event, as used herein, refers generally to an unstable situation of extreme danger or difficulty. Crisis situations typically share a common set of characteristics, such as time urgency, complex event or decision characteristics, rapidly changing event or decision conditions, a chaotic surrounding environment, physical and emotional stress, severe consequences for decision failure, poor data availability and quality, competing demands for a decision maker's attention, frequent interruptions during the decision-making process.

The system conducts predictive prompting for identifying decision options and outcomes. The system, for example, may use an iterative process involving the prediction of important event cues and characteristics, interaction with a user to prompt and gather important information, selection of "good enough" cases from a system knowledge base for use in decision-making and communication of those options to the user for effective support of decision-making. A "good enough" case, as used herein, is a case in a system knowledge base that may sufficiently represent a crisis at hand to form a basis for decision making in that crisis.

In one implementation, the decision support and training system provides a support system to enable a user to make decisions rather than an "expert" system that identifies a determined "best" option. In this implementation, the system provides options along with scores (e.g., confidence levels, percentages, or the like) to enable the decision maker to make an informed decision. A human decision maker, however, still makes an ultimate decision based on information provided by the support system instead of the system making a decision on its own.

Figure 1:
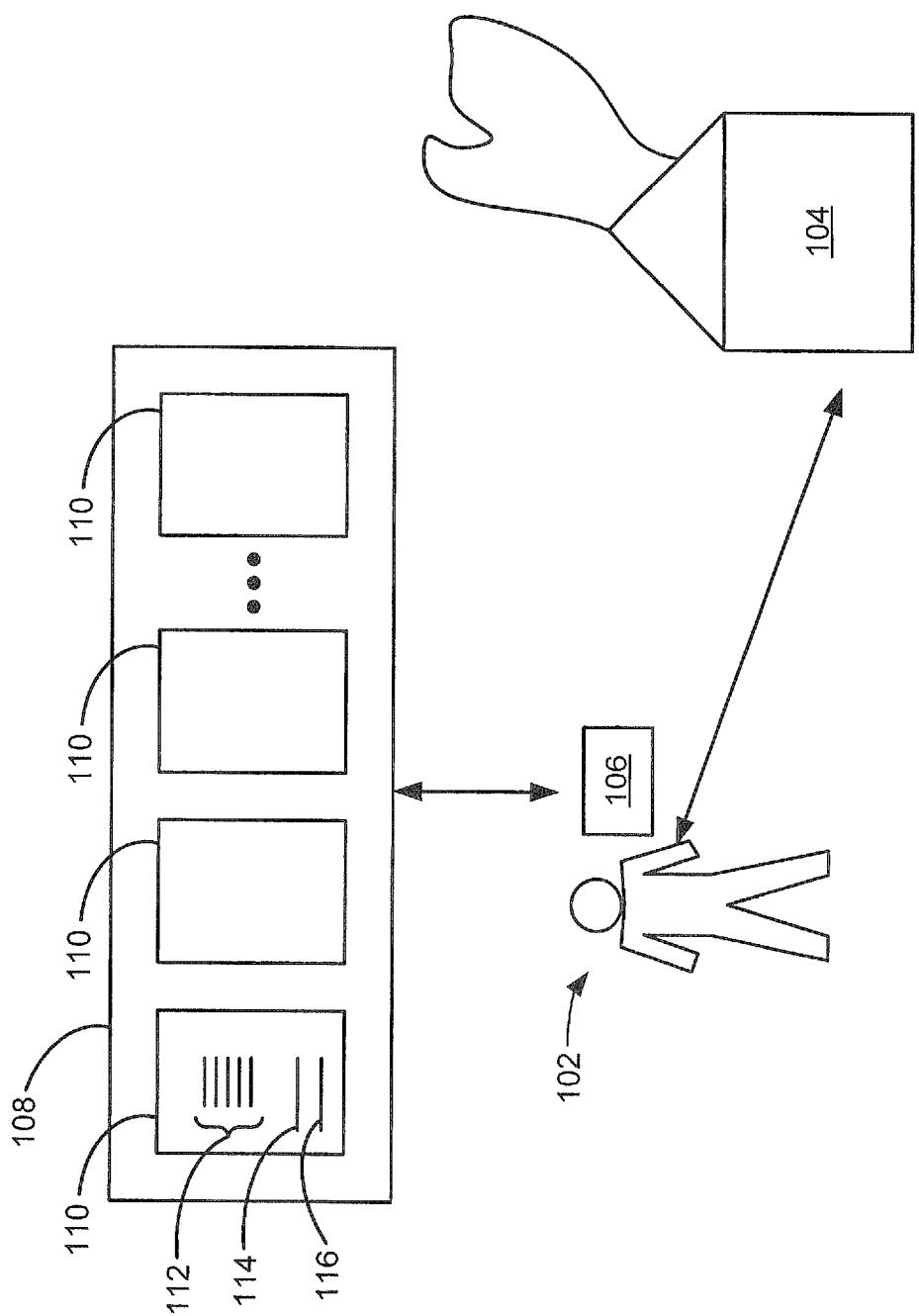
FIG. 1 illustrates an example system for assisting a decision maker in a crisis situation.

FIG. 1 illustrates an example system 100 for assisting a decision maker 102 in a crisis situation. The crisis, for example, may be a real or simulated crisis. In a real crisis, for example, the system 100, may be used to support a user's decision making process. Similarly, in a simulated crisis, the system may be used to train a user in a realistic scenario. By providing an unlimited number of realistic scenarios for training purposes, the system may provide "experience compression" for the user in which the system assists in rapidly building the user's internal knowledge base via an agile, enjoyable game-like experience. Thus, instead of taking twenty-plus years to build an internal knowledge base that may be required to operate effectively in various crisis events, the user may be able to rapidly build his or her own internal knowledge base in a fraction of the time that would otherwise be required.

In the example of FIG. 1, the decision maker 102 observes a crisis event 104 (e.g., a building on fire) and is faced with making a decision (or a series of decisions) related to that crisis event. The crisis event 104, for example, may comprise a real crisis scenario, a simulated training scenario (whether based on real or simulated events), or the like. In handling the crisis decision, the decision maker 102 is faced with making a series of decisions to respond to the situation. In a fire, for example, the decision maker 102 might initially decide whether to attack (e.g., send firefighters inside a burning structure to fight the fire and/or rescue individuals stuck in the burning structure) or defend the situation (e.g., set up a perimeter and fight the fire from the outside to attempt to extinguish the fire or to prevent the fire from spreading). Once the initial decision is made, the decision maker will face continuing decisions based on that initial decision and changing events related to the crisis event. In an attacking situation, for example, the decision maker 102 may decide where to enter the burning structure, how to enter the burning structure, how to arrange fire fighters and equipment, and the like. Similarly, in a defensive situation, the decision maker 102 may make any number of follow up decisions.

The decision maker 102 observes initial "size up" information about the crisis event 104. Initial size up information comprises information gathered about a crisis situation prior to beginning decision-making. Size up often occurs in the first few minutes after a decision-maker begins gathering information. The initial size up information, for example, may be selected based on the decision maker's personal knowledge or experience or may be prompted for by the system 100 based on information that has been deemed in the past to be relevant to a particular type of crisis event. In a fire, for example, the initial size up information about the situation may include the type of structure that is burning, the extent of the damage already caused by the fire, the color of smoke coming from the fire, whether the fire is visible burning through the roof, whether windows of the building have blown out, or any other information that may be readily collected from the present crisis situation.

The decision maker 102 can enter the initial size up information into the system 100. The initial size up information can be information that is known or observed relating to the crisis event when the user initiates a session with the system 100. In one particular implementation, for example, the decision maker 102 uses a communication device 106 (e.g., a wireless or wired communication device) to enter observed information in response to cues from the system 100. The communication device 106, for example, may provide a user interface (UI), such as a graphical user interface (GUI), that allows the user to communicate with the system visually, aurally, verbally, and/or textually. The size up information can be gathered in the form of cues (e.g., observations and data) and characteristics (e.g., attributes of an event). Information about each of the cues and characteristics may include an assigned value for the cue (e.g., "Yes" or "No") and the user's declared confidence in the assigned value (e.g., a score, weighting, probability, "Probably," Certainly," or the like). In one implementation, for example, the system 100 accommodates partial characterization of a crisis event and does not require full knowledge of the cues and characteristics associated with an event. The system may also accommodate erroneous observations of cues and characteristics (e.g., observations that are in error and do not properly represent the crisis event. The system 100 may also interact with the user to obtain information about value system(s) that the user employs in crisis decision-making (e.g., protection of property, protection of human life) or may make assumptions about such value systems. The system 100 converts the information into a machine readable form useable for analyses within the system and makes information available within the system (or externally, such as to other members of a community).

The initial size up information is compared against a knowledge base 108 to identify possible cases from the knowledge base 108 that match the initial size up information. The knowledge base 108 includes possible cases that can serve as a basis for making decisions related to the current crisis event 104. The knowledge base 108 may be established from personal experience, training, history, simulation, and the like from one or more decision makers or even from an entire community of people with experience in a particular field, such as fire fighting, hazardous materials, combat, or the like. A community, for example, may comprise a broad group of persons making decisions in a particular area of crisis management, often widely dispersed geographically across many individual crisis management organizations. In one implementation, for example, a knowledge base, such as the knowledge base 108, may be converted to a Pattern Recognition Engine (PRE). A pattern recognition engine, for example, may comprise a software application that classifies or describes objects, events or other meaningful regularities in noisy or complex environments. In one embodiment, for example, the PRE may be embodied in an Artificial Intelligence Engine. On example of an Artificial Intelligence Engine that may be used is a Neural Network Artificial Intelligence Engine described below with reference to FIG. 2. In this embodiment, cues and characteristics from event/decision pairs stored in the knowledge base 108 are used to create and "train" the pattern recognition engine. The knowledge base 108 may be created and managed separately by the system 100. Other types of Artificial Intelligence Engines, however, may also be used.

In one particular implementation, for example, the knowledge base 108 comprises a plurality of records 110 each corresponding to a case (e.g., an historical event). Each record of the knowledge base includes a plurality of attributes 112 that represent information about the case that someone previously thought was important to an outcome or decision-making process for that case. Each record also includes a decision outcome 114 that was made in that case and a quality 116 for that decision (e.g., whether the decision outcome was good, bad, or indifferent).

In one implementation, for example, the system 100 evaluates the cues and characteristics (e.g., the initial size up information or later cues and characteristics) gathered from the user against stored cases (e.g., event/decision pairs) from the knowledge base 108. This process may be dynamic in which a new evaluation is performed with new outcomes each time a new or updated set of cues is obtained by the system 100.

The evaluation of the gathered cues and characteristics against the stored cases can be used to identify good enough cases from the knowledge base, predict cues and characteristics that will effectively converge or narrow a range of decision options, and detect suspicious observations. Cues associated with a crisis situation can be specified so that the cases returned by the pattern recognition engine are more similar to each other, resulting in greater similarity in decisions and outcomes. In one implementation, for example, the pattern recognition engine searches for cues that are key to producing cases that are more similar to each other than those previously identified. In another implementation, the pattern recognition engine searches for cues that will produce a bifurcated distribution of cases—thus a definite "Yes" or "No" attribute for the cue can eliminate half or nearly half of the remaining cases from consideration in the decision.

In one particular implementation, for example, a pattern recognition engine is used to analyze the cues and characteristics gathered from the user against the patterns of cues and characteristics stored in or trained into the pattern recognition engine. In this implementation, the pattern recognition engine uses pattern matching approaches to calculate scores (e.g., numeric scores) that depict how well each case in the knowledge base 108 matches the cues and characteristics known to the user. The pattern recognition engine then rank orders all cases from the knowledge base 108 against the value system identified for the user.

The pattern recognition engine also analyzes cues and characteristics in the knowledge base that are not declared to be well known to the user for the particular crisis event at hand. The pattern recognition engine examines patterns within the pattern recognition engine to identify those cues (e.g., "Next Best Question Cues") for which a change from an unknown state to a known state would most converge the range of decisions represented in the good enough cases.

The pattern recognition engine may also use pattern recognition approaches to determine cues and characteristics communicated by the user that represent anomalies when compared to the patterns stored in or trained into the pattern recognition engine. These cues and characteristics may then be treated and/or identified as suspicious cues and characteristics.

The pattern recognition engine then makes the rank ordered good enough cases, the good enough case score for each case, the list of Next Best Question Cues, and the list of suspicious cues and characteristics available within the system 100.

The system 100 then presents the information found from comparing the initial size up information to the knowledge base 108 to the user (e.g., via communication device 106). The system 100, for example, may present a subset of the rank ordered good enough cases, a good enough case score for each good enough case, a list of next best question cues, and a list of suspicious cues and characteristics to the user on the mobile device 106. The subset, for example, may comprise one or more pre-defined features (e.g., a pre-defined number of good enough cases to be displayed to a user) or may vary depending on the circumstances of the crisis event. Features of the subset, for example, may be pre-set within the system or pre-defined as a user preference. The information to the user may be presented to the user in a manner designed for effective user evaluation and system interaction in crisis environments. One implementation of this interaction is a graphical user interface in which the system 100 communicates with the user visually, aurally, verbally, and/or textually.

In one particular implementation, for example, the system 100 communicates good enough cases to the user in which each case includes a good enough case score, event characteristics, a decision result, an outcome from the decision, an evaluation or quality of the decision, and supplementary information. The user can then evaluate the options against the user's value system in order to choose an option for further consideration and modification.

The system 100 can also communicate a range of decision options represented in the identified good enough cases to the user. In this implementation, the user can evaluate the options against the user's risk tolerance and uncertainty tolerance in order to decide whether further convergence in options is needed before the user selects one or more of the good enough cases for further consideration and modification. The system can also communicate a predetermined subset of higher-ranking next best question cues so that the user can prioritize further information gathering activities. The user can also decide whether an answer to any of the next best question cues is readily available to see if further convergence of decision outcomes is relatively easier to accomplish before making a decision based on the good enough cases presented.

The system 100 can also communicate any suspicious cues or characteristics to the user for evaluation. The user, for example, can determine whether to re-examine the suspicious information in order to provide better convergence of the decision outcomes. In one implementation, for example, the system 100 can provide a list of suspicious cues and characteristics along with guidance for evaluating and resolving conflicts.

The system 100 then prompts the user to determine how to proceed in the decision support process. In one implementation, for example, the system 100 prompts the user to provide an answer to the next best question (or another highly rated question) in order to converge the decision options, modify suspicious cues and characteristics in order to converge the decision options, select one of the good enough cases and elect to move forward in the decision support process, or to take some other action.

In this implementation, if the user elects to answer the next best question, the system 100 can prompt the user to provide information about the highest value (or another highly rated) next best question cue. For example, the system 100 may provide an interactive question-and-answer session, a matrixed check list, or some other interactive information gathering session. Information gathered about each next best question cue can include a value assigned to the cue by the user (e.g., "Yes" or "No") and the user's declared confidence in the assigned value (e.g., a score, weighting, probability, "Probably," Certainly," or the like). The system 100 can then convert the information into a machine useable format for analyses within the system 100. The system then returns to the operation of determining new good enough cases and next best questions described above based on the newly received information. This process may be performed repeatedly in an iterative manner until the user is comfortable selecting a good enough case from the choices and proceed with the decision support process.

If the user elects to modify one or more suspicious cues or characteristics, the system 100 guides the user through a diagnosis of the suspicious conflicting cues and characteristics. Example implementations of this process, for example, include an iterative question-and-answer session, a matrixed check list showing current selections, highlighting conflicts, and allowing changes, or another interactive information gathering session. Modified information gathered about one or more suspicious cue or characteristic, for example, can include a value assigned by the user (e.g., "Yes" or "No") and a confidence value declared by the user (e.g., a score, weighting, probability, "Probably," Certainly," or the like). The system 100 then converts the information into a machine useable form for analyses within the system and makes the information available within the system. Again, the system 100 returns to the operation of determining new good enough cases and next best questions described above based on the newly received information. This process may be performed repeatedly in an iterative manner until the user is comfortable selecting a good enough case from the choices and proceed with the decision support process.

If the user selects one of the good enough cases, the system interacts with the user to identify the selected good enough case and makes the selection available within the system for the next step in the decision engine.

Figure 2:
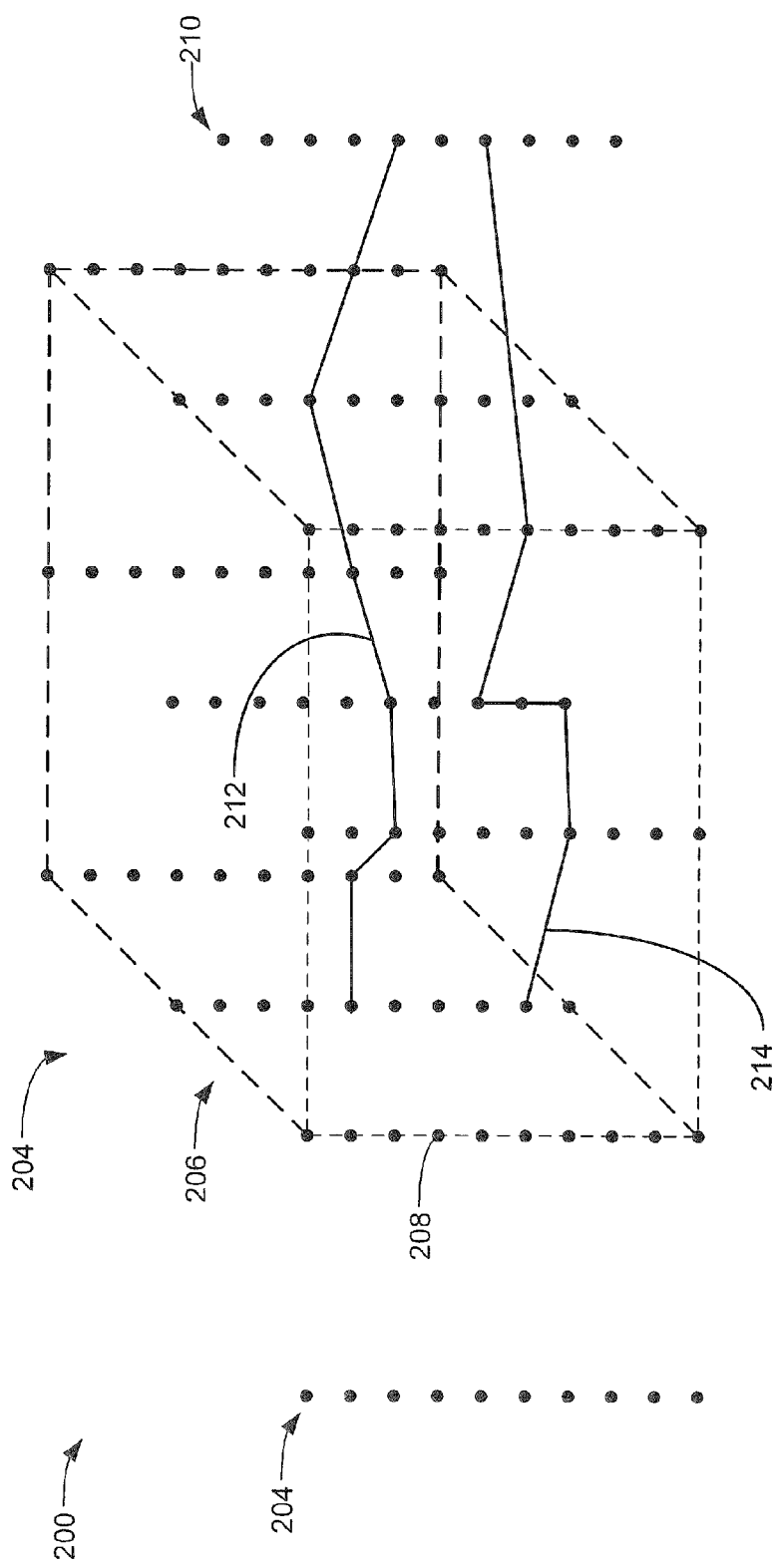
FIG. 2 illustrates an example pattern recognition engine (PRE) implemented within a neural network.

FIG. 2 illustrates an example pattern recognition engine (PRE) 200 implemented within a neural network 202. The neural network 202 includes a plurality of inputs 204 received from a user in response to one or more cues. The plurality of inputs 204, for example, may correspond to initial size up information, answers to one or more next best questions, revised answers to suspicious cues and characteristics, or the like. The plurality of inputs 204 feed into a "brain" 206 of the neural network 202 that comprises a plurality of nodes corresponding to categories (e.g., attributes and characteristics that may be pertinent to a particular crises event). In this particular implementation, the brain 206 of the neural network 202 is illustrated as a three-dimensional arrangement of nodes 208. The three-dimensional arrangement of nodes 208 feeds into a plurality of output nodes 210 that correspond to outcomes or decisions for the stored cases.

Cases of a knowledge base are stored within the neural network as paths through the three-dimensional arrangement of nodes 208 in the brain 206 of the neural network 202. Thus, a case may have known attributes represented by a plurality of the nodes 208 through which a path may be drawn. Simplified example paths 212 and 214 are shown as examples in FIG. 2. The paths 212 and 214, for example, connect a plurality of nodes within the three-dimensional arrangement of nodes 208 of the brain 206 of the neural network 202.

Thus, attributes and characteristics of a crisis event received from a user may be compared to attributes and characteristics of stored cases to determine a score representing a match or overlap of the attributes and characteristics of the crisis event to attributes and characteristics from each case stored within the neural network 202. Thus, the pattern recognition engine 200 can be used to derive or calculate scores that depict how well each case stored in the knowledge base matches the attributes and characteristics received from the user pertaining to a crisis event.

Similarly, the pattern recognition engine 200 may also analyze each (or a subset) of the cues represented by one or more nodes 208 within the brain 206 of the neural network 202. The pattern recognition engine can determine whether a change in state of the input cues from the user will minimize, or at least reduce, the likelihood of as many outcome/decision pairs matching so that only a few highly ranked outcome/decision pairs remain as good enough cases.

The pattern recognition engine 200, thus, can identify one or more cues that, if answered, will reduce the likelihood of the largest number of outcome/decision pairs matching the current crisis event. By answering one or more of these identified cues, a user can allow the pattern recognition engine 200 to rapidly converge on a subset of good enough cases from which the user may select a case.

Figure 3:
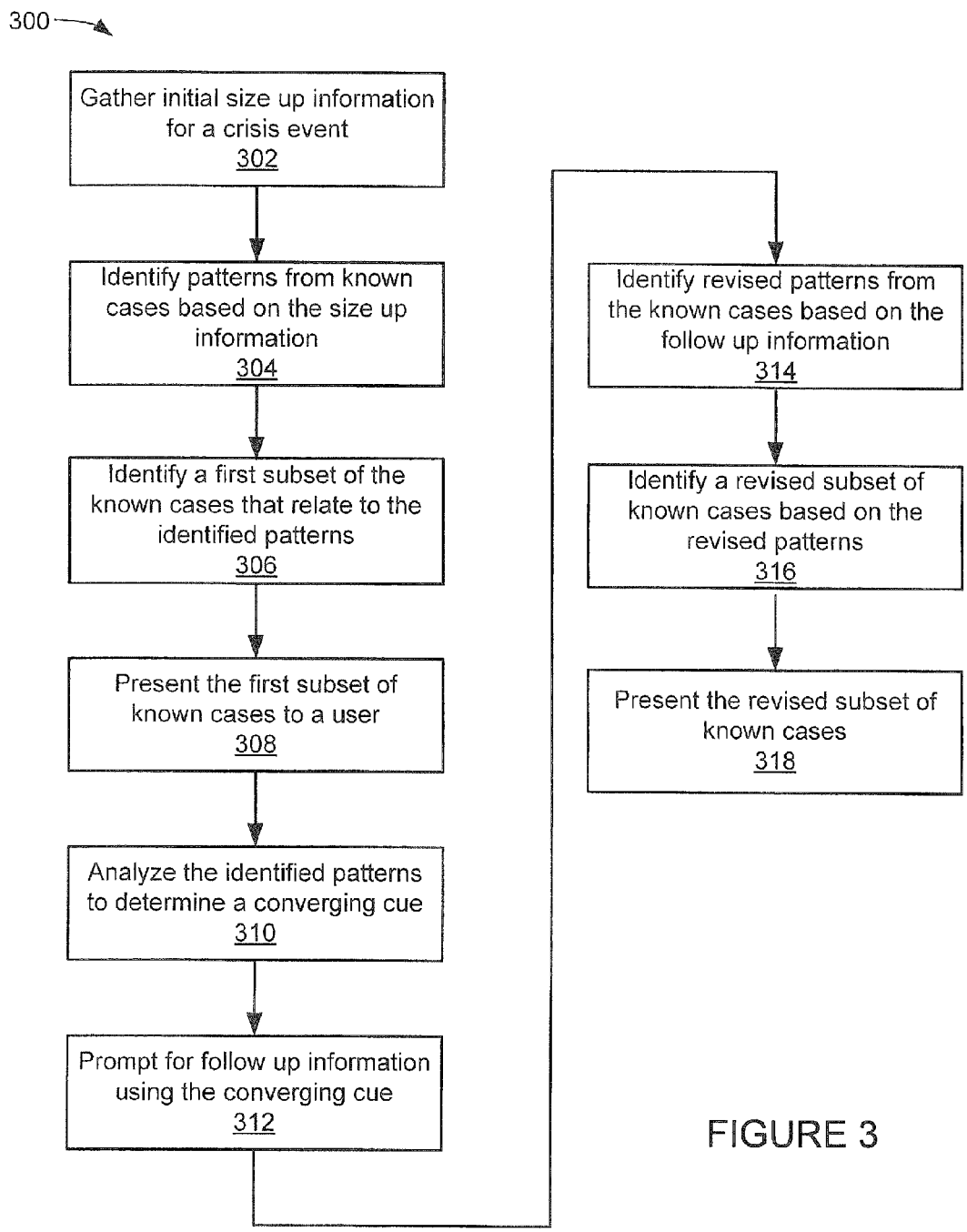
FIG. 3 illustrates example operations for providing predictive prompts in a decision-making process.

FIG. 3 illustrates example operations 300 for providing predictive prompts in a decision-making process. Initial size up information about a crisis event is gathered from a user in operation 302. Then, patterns are identified from known cases based on the size up information in operation 304. Each of the known cases comprises attributes and at least one outcome. In operation 306, a subset of the known cases that relate to the identified patterns is identified.

The identified subset of known cases is then presented to the user in operation 308. In one implementation, for example, each member of the subset of known cases is presented to the user along with a score indicating a confidence level of the member.

The identified patterns are then analyzed in operation 310 to determine a converging cue that, if answered, will provide a second subset of known cases that includes a more converged range of decision outcomes than the first subset. The user is then prompted, using the determined cue, to gather follow up information related to that cue in operation 312. Revised patterns are then identified from the known cases based on the follow up information in operation 314, and a revised subset of known cases is identified that relate to the revised patterns in operation 316. The revised subset of known cases is presented to the user in operation 318.

Figure 4:
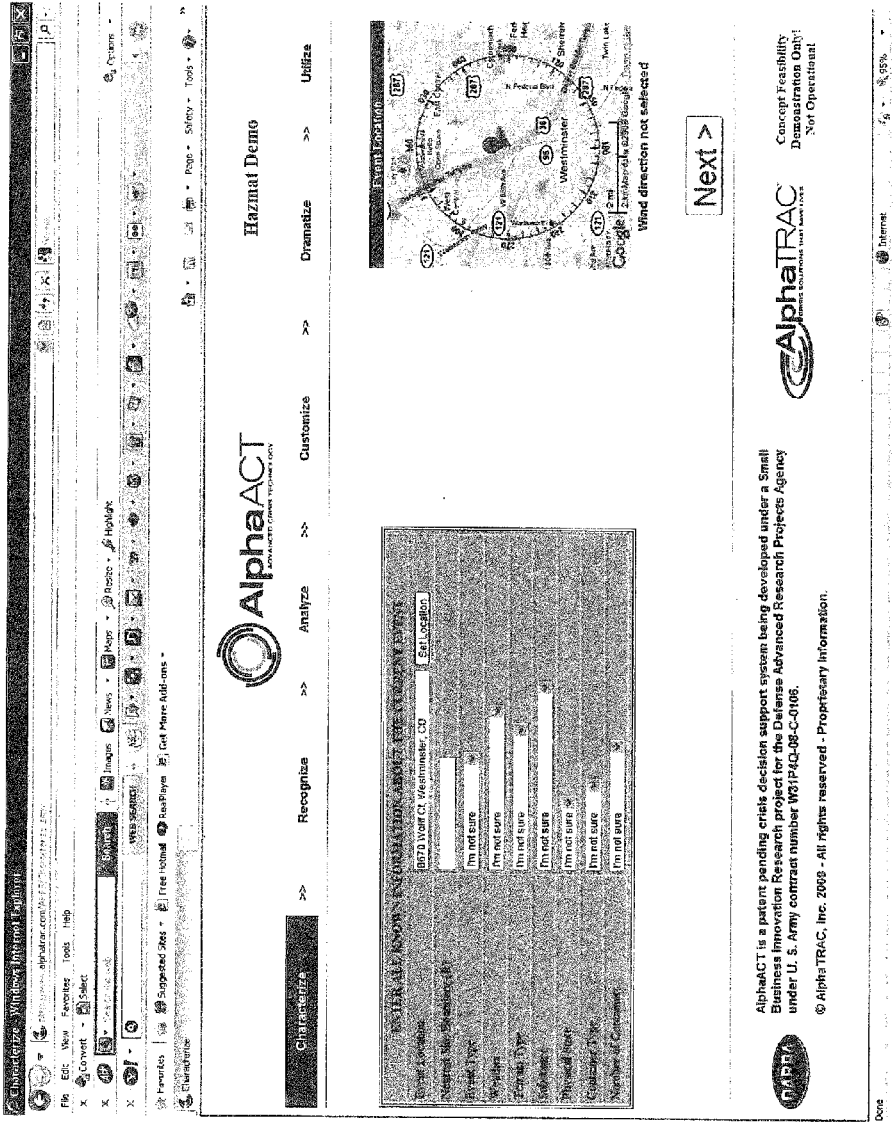
FIG. 4 illustrates an example user-interface for use in a decision and training support system.

FIG. 4 illustrates an example user-interface 400 in which a user is prompted to input initial size up event information for a hazardous material crisis event. In this particular implementation, for example, the user-interface 400 includes a plurality of data inputs (e.g., pull-down menus, text boxes, and user-activatable buttons). The user interface, in this implementation, also provides an interactive map to the right of the screen shot in which the user may enter data, such as a wind direction, location, traffic patterns, or the like. The data inputs shown are merely exemplary and any number of data inputs, such as input boxes, selections of pictures/icons, map selections, free-form text entry, voice-entry, may be used. A user can enter data for any or all of the data inputs to establish initial size up information for the particular crisis event.

Figure 5:
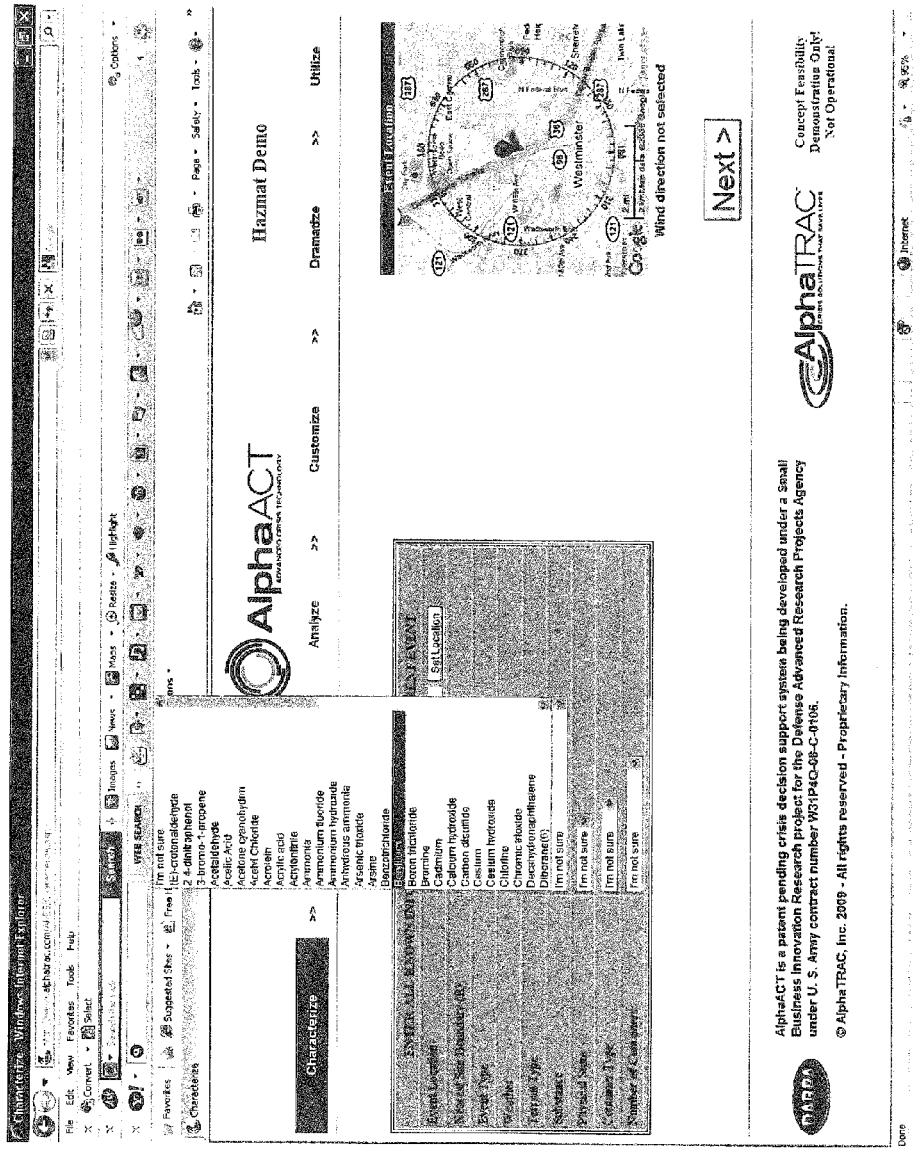
FIG. 5 illustrates another example of a user-interface for use in a decision support and training system.

FIG. 5 illustrates another example of a user-interface 500 in which the user has activated a pull-down menu for one of the prompts of the plurality of data inputs from FIG. 4 in which the user has activated a pull-down menu for identifying a hazardous substance involved in the crisis event. In the example shown in FIG. 5, for example, the user has selected Berylium as a substance of interest in the particular crisis event.

Figure 6:
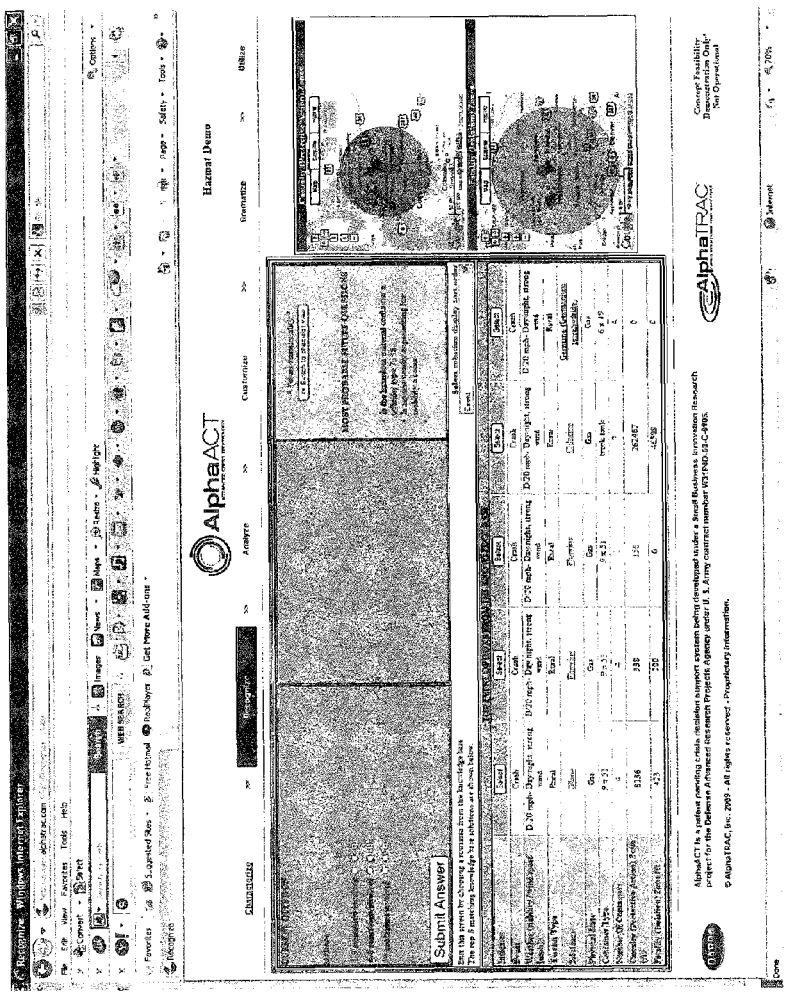
FIG. 6 illustrates yet another example of a user-interface for use in a decision support and training system.

FIG. 6 illustrates yet another example of a user-interface 600 displayed after the user has already characterized the event with initial size up event information. At this point, the user interface 600 displays the top matching options selected from a knowledge base using a pattern recognition engine and requests more information to converge the range of results. In this particular example, the user-interface 600 also displays prompts for the user to answer a current question of how many containers are involved in the current crisis. In this example, the system identifies three ranges and provides selectable interfaces for the user to select an answer to the question. The user interface 600 also identifies two next best question cues: (1) is the hazardous material container a cylinder type 7×33, and (2) is anyone nearby experiencing a low mobility.

Figure 7:
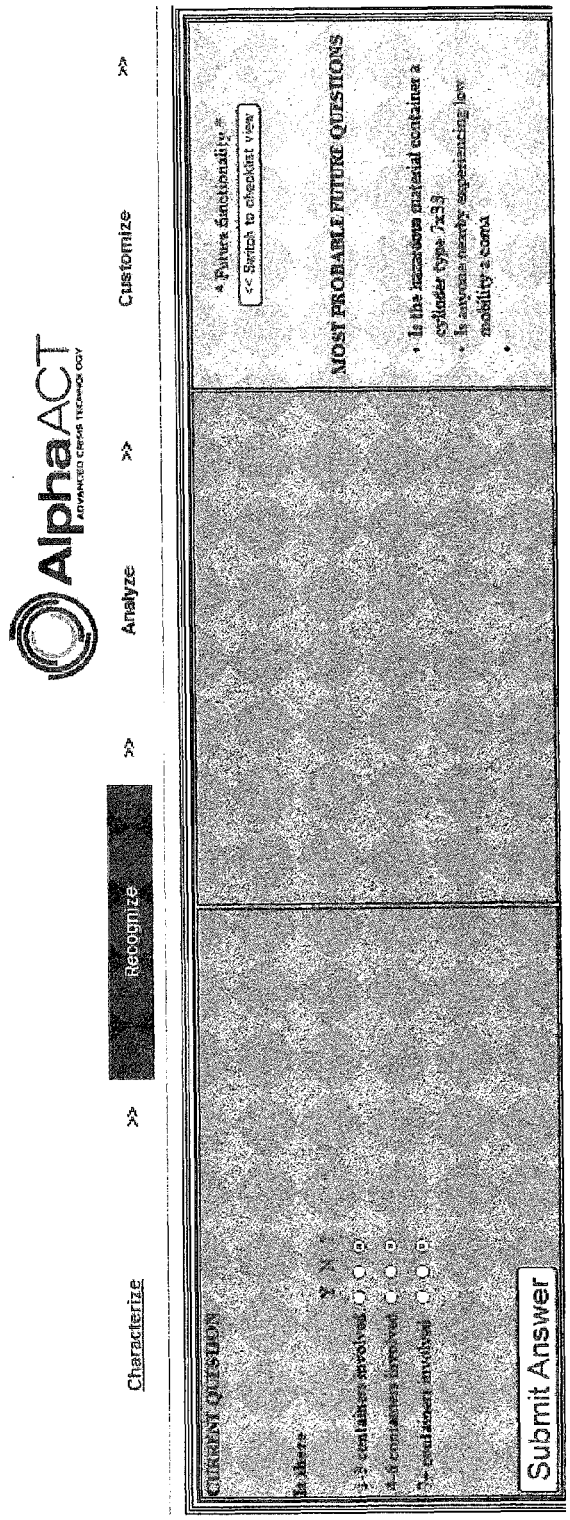
FIG. 7 illustrates a close up view of a first portion of the user interface shown in FIG. 6.

FIG. 7 illustrates a close up view of a first portion 700 of the user interface 600 showing the current question from FIG. 6 in which the user may answer this particular question with prompts indicating a "Yes," "No," or "Unknown" answer to the question. FIG. 7 also shows two most probable future questions from FIG. 6 that, if answered, would likely create convergence in the range of answers.

FIG. 8 illustrates a close up view of a second portion 800 of the user interface 600 showing the list of possible events from FIG. 6. The events listed, in this example, are the top pattern matches returned from the pattern recognition engine based on the current information that has been input.

Figure 9:
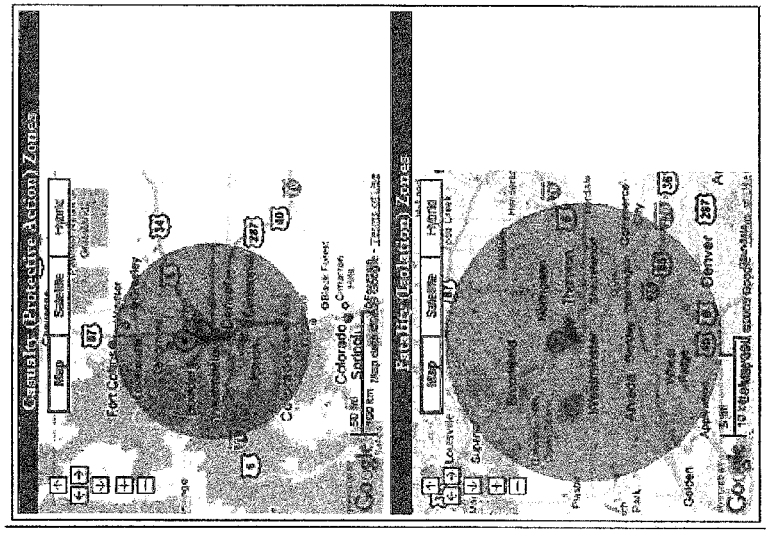
FIG. 9 illustrates a close up view of a third portion of the user interface shown in FIG. 6.

FIG. 9 illustrates a close up of a third portion 900 of the user interface 600 showing a pair of maps from FIG. 6. In this portion 900, the maps illustrate a casualty (protection action) zone and a fatality (isolation) zone determined based on a range of zones retrieved from cases selected in the events listed in FIG. 8.

Figure 10:
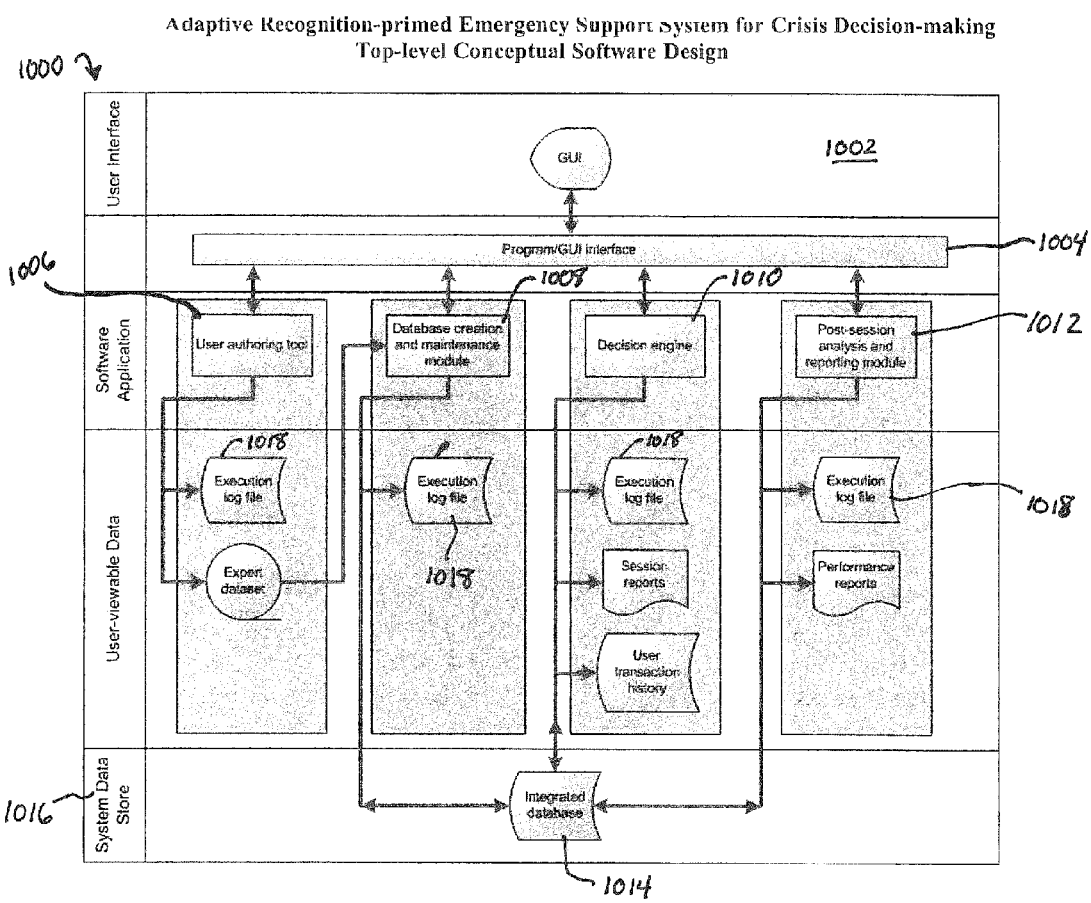
FIG. 10 illustrates an example conceptual top-level software design for a decision and training support system.

FIG. 10 illustrates an example conceptual top-level software design 1000 in which the decision support system can be implemented. In the software design 1000, a user interface (UI) 1002 (e.g., a graphical user interface (GUI)) is provided to allow a user to interact with the decision support system via a program/user interface 1004. The user interface comprises software modules liked to computer hardware devices and provides a communications channel between the software applications and the system user. In the implementation shown in FIG. 10, a single user interface 1002 is provided that allows for a consistent user experience across each software application implemented in the software design. In this implementation, the user interface may be platform independent, and provide for differences in hardware and operating system software platforms. The user interface may be visual (e.g., text and graphics) and audio for output, as well as including manual (e.g., keyboard, mouse, pointing device) and verbal (e.g., or sound) for input. In one implementation, the user interface is compatible with standard personal computer, personal digital assistant hardware, smart telephones, or other communication devices that may be used by a decision-maker to interact with the decision support and training system.

The program/user interface 1004 provides a consistent set of objects and methods to communicate textual, graphical, and audio data between applications and the user interface 1002. The program/user interface 1004, for example, transforms user interface specific data structures to/from applications and the user interface 04.

In the implementation shown in FIG. 10, the software design comprises four software applications: a user authoring tool module 1006, a database creation and maintenance module 1008, a decision engine module 1010, and a post-session analysis and reporting module 1012. However, any number of applications may be implemented. In this implementation, the user authoring tool module 1006 provides a mechanism for end user authoring of an observation/decision pathway knowledge base and an interactive user environment for building the observation/decision pathway knowledge bases, such as with an import of pre-defined data formats. Pre-defined datasets, for example, may contain event/decision pair data and user-supplied information.

The database creation and maintenance module 1008 provides a mechanism to create and maintain an integrated database 1014 of a system data store 1016. In one implementation, the database creation and maintenance module 1008 provides an interactive user environment for building, merging, editing, and reporting on a structure of the integrated database 1014. In the implementation shown in FIG. 10, for example, the database creation and maintenance module 1008 comprises an execution log file and an expert dataset. The database creation and maintenance module 1008 may also provide asynchronous user interaction and sequential expert dataset processing.

The decision engine module 1010 performs a recognition-primed decision function included in the decision support and training system. In one implementation, for example, the decision engine module 1010 provides a mechanism to implement the recognition-primed decision model incorporating a neural network pattern recognition engine and an interactive user intercase as described above. The decision engine module 1010 may also support asynchronous user interaction and use synchronous communications techniques.

The post-session analysis and reporting module 1012 analyzes and provides reports on the decision engine transaction histories, such as to provide post-session analysis and reports for decision engine training sessions and group analyses (e.g., for group competitions). The post-session analysis and reporting module 1012 may also provide for asynchronous user interaction for data and report selection to process the transaction history datasets.

On or more execution log files 1018 provide a mechanism for the software applications and modules to record diagnostic information for later processing and/or review. In one particular implementation, for example, the execution log file(s) 1018 allow the log file to be opened, log messages to be appended to the file, and the log file closed.

A report generation module may be used to generate reports (e.g., in a standard or custom format). The reports may be recorded for later viewing, archiving, printing, and the like. In one particular implementation, for example, the report generation function may allow a file to be opened, a format selected, report information appended to the file, and the file closed. A transaction history module provides a mechanism for saving a transaction history and/or program state information to provide an audit trail history of program steps and user input during a recognition-primed decision session. In one implementation, the transaction history module allows for a file to be opened, transaction information to be appended, the file closed, and transactions to be read and/or replayed.

An expert dataset software class and system file provides an intermediate file structure for creating the observation/decision pathway knowledge bases. The expert dataset, for example may be used to provide a sequential, editable (e.g., with a text editor) dataset to be used in the creation of an integrated database. In one implementation, the expert dataset allows for a file to be opened, read, written to, and closed.

The integrated database 1014 of the system data store, in one implementation, comprises a relational database and software module to provide a storage mechanism for all data related to the decision engine and its processes and a relational interface to the data for functionality of the decision engine. In one implementation, for example, the integrated database allows for the database to be opened, object methods to be processed for access (e.g., SQL access), and the database to be closed.

Figure 11:
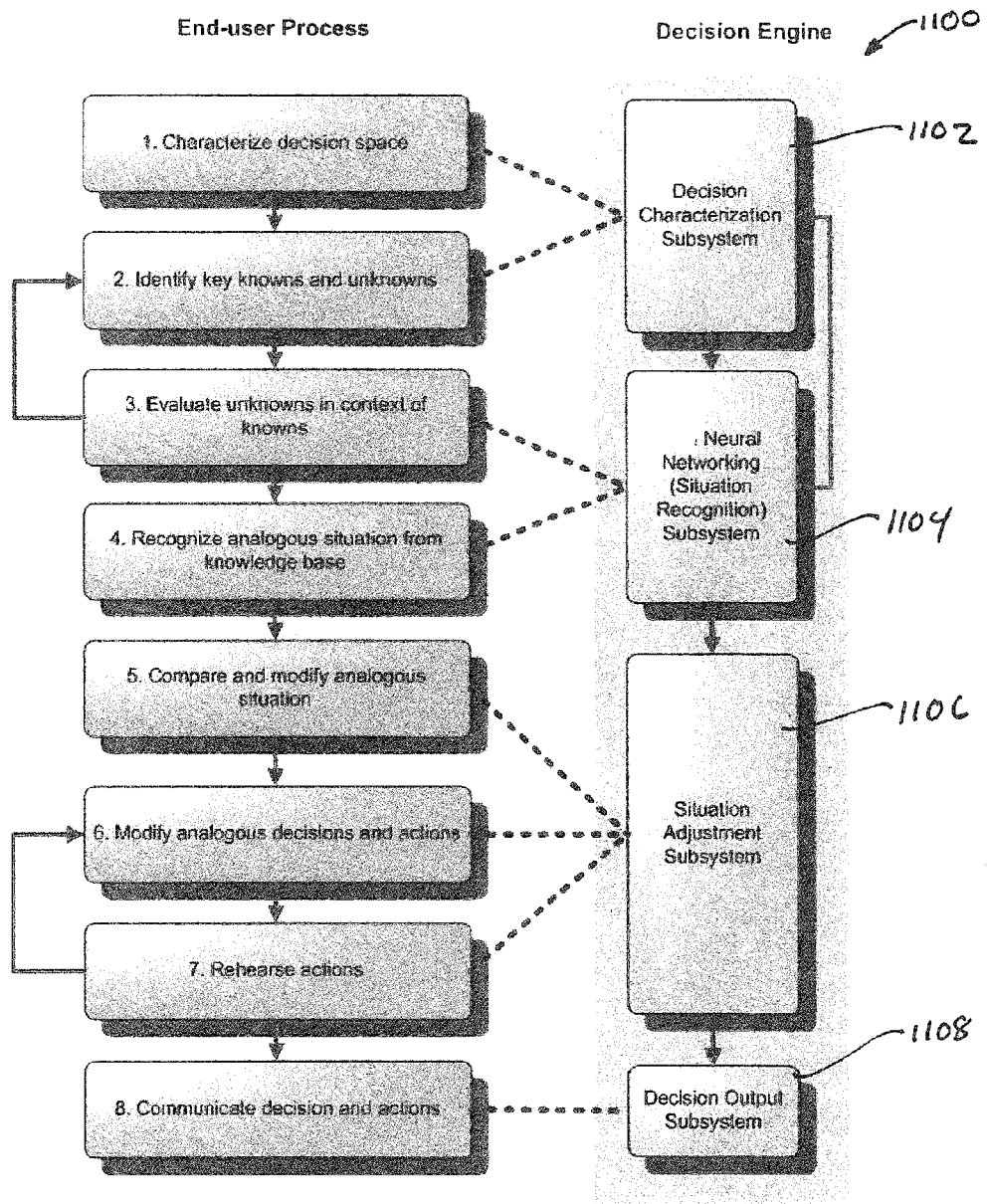
FIG. 11 shows an example implementation of a decision engine that may be used within a decision and training support system.

FIG. 11 shows an example implementation of a decision engine 1100 in which the decision engine 1100 comprises four subsystems, although any number of systems or subsystems may be implemented. In FIG. 11, for example the decision engine 1100 comprises a decision characterization subsystem 1102, a neural network-based pattern recognition engine (situation recognition subsystem 1104), a situation adjustment subsystem 1106, and a decision output subsystem 1108.

In this implementation, a decision characterization subsystem, working with a GUI, supports a Characterize Step in the process (the size up activity). A neural network-based pattern recognition engine, working with the GUI, supports a Recognize Step in the process (recognition and selection of a good enough case as described above). A situation adjustment subsystem, working with the GUI and other subsystems, supports the Analyze, Customize and Dramatize steps in the process (modification and customization of the selected case). A decision output subsystem, working with the GUT and other subsystems, supports a Utilize step in the process (compiling, organizing and communicating the decisions and resulting actions resulting from the decision process). This implementation is merely exemplary and the process may be implemented in a number of other manners.

Figure 12:
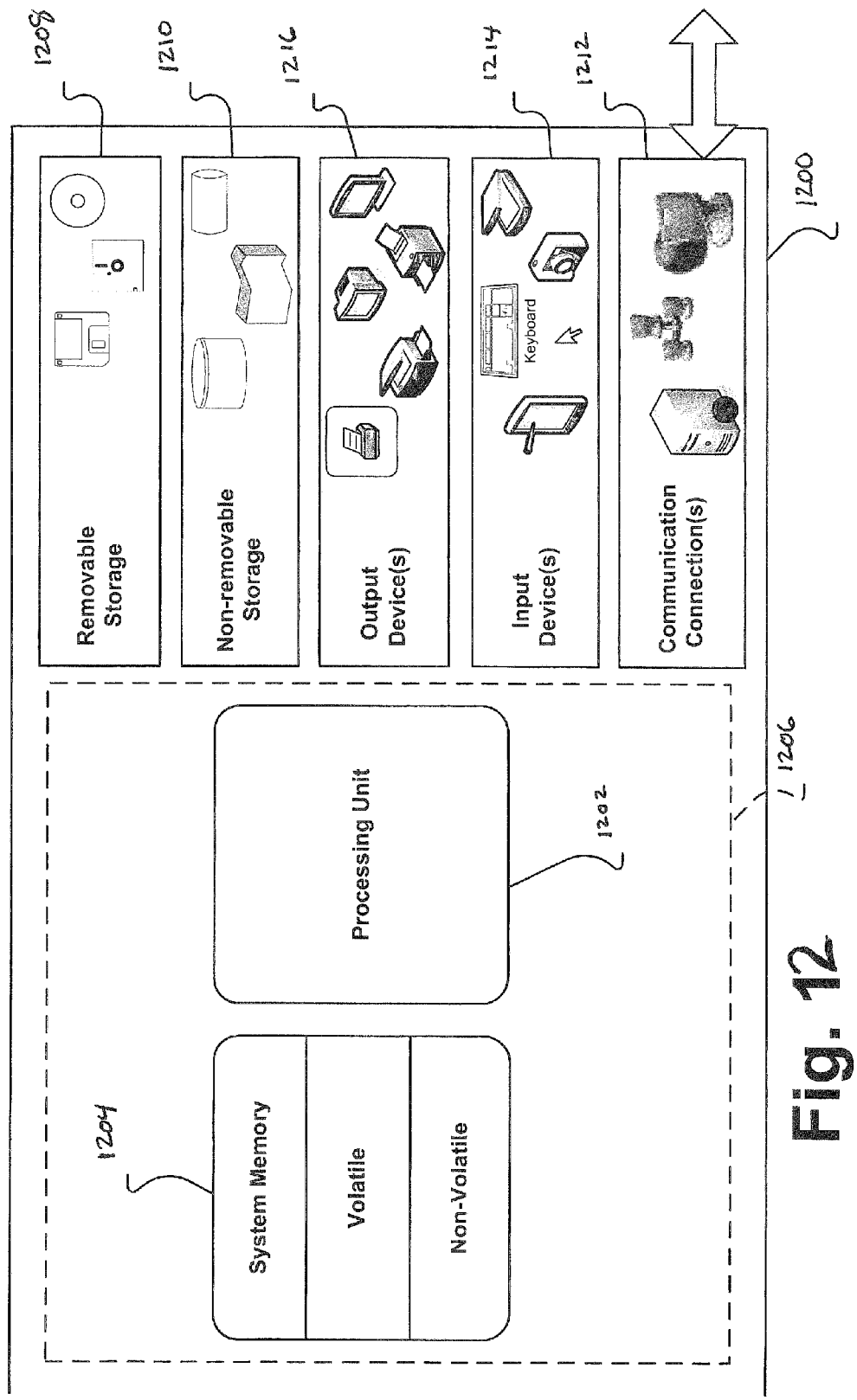
FIG. 12 illustrates an exemplary computer system for an example decision and training support system.

FIG. 12 illustrates an exemplary computer system 1200 for an example crisis decision support system as described herein. In one implementation, the computer system 1200 may be embodied by a desktop computer, laptop computer, or application server computer, although other implementations, for example, video game consoles, set top boxes, portable gaining systems, personal digital assistants, and mobile phones may incorporate the described technology. The computer system 1200 typically includes at least one processing unit 1202 and memory 1204. Depending upon the exact configuration and type of the computer system 1200, the memory 1204 may be volatile (e.g., RAM), non volatile (e.g., ROM and flash memory), or some combination of both. The most basic configuration of the computer system 1200 need include only the processing unit 1202 and the memory 1204 as indicated by the dashed line 1206.

The computer system 1200 may further include additional devices for memory storage or retrieval. These devices may be removable storage devices 1208 or non-removable storage devices 1210, for example, magnetic disk drives, magnetic tape drives, and optical drives for memory storage and retrieval on magnetic and optical media. Storage media may include volatile and nonvolatile media, both removable and non removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 1202. Information, for example, events, observable indicators, resulting decisions or other information, may be stored on the storage media using any method or technology for storage of data, for example, computer readable instructions, data structures, and hardware or software program modules.

The computer system 1200 may also have one or more communication interfaces 1212 that allow the system 1200 to communicate with other devices. The communication interface 1212 may be connected with a network. The network may be a local area network (LAN), a wide area network (WAN), a telephony network, a cable network, an optical network, the Internet, a direct wired connection, a wireless network, e.g., radio frequency, infrared, microwave, or acoustic, or other networks enabling the transfer of data between devices. Data is generally transmitted to and from the communication interface 1212 over the network via a modulated data signal, e.g., a carrier wave or other transport medium. A modulated data signal is an electromagnetic signal with characteristics that can be set or changed in such a manner as to encode data within the signal.

Various hardware and/or software modules may be resident on different locations of a network. A user interface, such as a graphical user interface (GUI), for example, may reside on a computer or other hardware device that is connected to a network and access other hardware and/or software modules that reside on other computers or hardware via a network. In one particular implementation, for example, a user may interact with a GUI on a laptop or other device connected to a network, such as the Internet, a LAN, a WAN, or the like. The GUI on the device may interact with other program or hardware modules via the network that reside on a remote server or other device that is also connected to the network.

In some implementations, articles of manufacture are provided as computer program products. One implementation of a computer program product provides a computer program storage medium readable by the computer system 1200 and encoding a computer program. Another implementation of a computer program product may be provided in a computer data signal embodied in a carrier wave by the computer system 1200 and encoding the computer program.

The computer system 1200 may further have a variety of input devices 1214 and output devices 1216. Exemplary input devices 1214 may include a keyboard, a mouse, a tablet, a touch screen device, a scanner, a visual input device, and a microphone or other sound input device. Exemplary output devices 1216 may include a display monitor, a printer, and speakers. Such input devices 1214 and output devices 1216 may be integrated with the computer system 1200 or they may be connected to the computer system 1200 via wires or wirelessly, e.g., via a Bluetooth protocol. These integrated or peripheral input and output devices are generally well known and are not further discussed herein. In one implementation, program instructions implementing the methods or the hardware and/or software modules for database creation, database maintenance, decision engine, analysis, reporting, execution, report generation, transaction history, expert dataset creation or maintenance, or the like, may be embodied in the memory 1204 and storage devices 1208 and 1210 and executed by processing unit 1202. Other functions, for example, handling network communication transactions, may be performed by an operating system in the nonvolatile memory 1204 of the computer system 1200.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of providing predictive prompts for decision-making, the method comprising:
   identifying patterns from known cases based on information for a crisis event, wherein each of the known cases comprises attributes and at least one outcome;
   identifying a first subset of the known cases that relate to the identified patterns; and
   analyzing the patterns to determine a cue that, if answered, will provide a second subset of the known cases including a more converged range of decision outcomes than the first subset.

2. The method of claim 1 wherein the information for the crisis event comprises initial size up information for the crisis event.

3. The method of claim 1 further comprising gathering information related to the determined cue.

4. The method of claim 3 further comprising identifying revised patterns from the known cases based on the gathered information related to the determined cue.

5. The method of claim 4 further comprising identifying a third subset of the known cases that relate to the revised patterns.

6. The method of claim 5 further comprising re-analyzing the revised patterns to determine a second cue that, if answered, will provide a fourth subset of known cases with a more converged range of decision outcomes than the third subset.

7. The method of claim 1 wherein the operation of identifying a subset of the known cases is performed using a pattern recognition engine.

8. The method of claim 7 wherein the pattern recognition engine is implemented using an artificial intelligence engine.

9. The method of claim 8 wherein the artificial intelligence engine comprises a neural network including a plurality of nodes corresponding to attributes of the known cases.

10. The method of claim 1 wherein the operation of analyzing the patterns to determine the cue is performed using a pattern recognition engine.

11. The method of claim 10 wherein the pattern recognition engine is implemented using an artificial intelligence engine.

12. The method of claim 11 wherein the artificial intelligence engine comprises a neural network including a plurality of nodes corresponding to attributes of the known cases.

13. The method of claim 1 wherein the second subset of known cases provides at least one good enough known case to sufficiently represent the crisis event to form a basis for decision-making in the crisis event.

14. The method of claim 1 further comprising identifying at least one suspicious cue or characteristic.

15. The method of claim 14 further comprising presenting the at least one suspicious cue or characteristic for re-examination.

16. The method of claim 14 wherein modifying the suspicious cue or characteristic further converges the range of decision outcomes.

17. The method of claim 1 further comprising evaluating the second subset of cases against a user tolerance.

18. The method of claim 1 further comprising ranking the second subset of known cases against a value system.

19. The method of claim 1 further comprising prompting for an answer to a converging question related to the cue.

20. A system for providing predictive prompts for decision-making, the system comprising:
    a pattern recognition engine configured to:
       store attributes for a plurality of known cases each comprising attributes and at least one outcome,
       identify a first subset of the known cases that relate to patterns identified from the known cases based on information for a crisis event, and
       analyze the patterns to determine a cue that, if answered will provide a second subset of known cases with a more converged a range of decision outcomes that the first subset.

21. The system of claim 20, wherein the pattern recognition engine comprises an artificial intelligence engine.

22. The system of claim 21 wherein the artificial intelligence engine comprises a neural network including a plurality of nodes corresponding to attributes of the known cases.

23. The system of claim 20 wherein the pattern recognition engine further configured to identify at least one suspicious cue or characteristic.

24. One or more non-transitory computer-readable storage media storing computer-executable instructions for executing on a computer system a computer process that provides predictive prompts for decision-making, the computer process comprising:
    identifying patterns from known cases based on information for a crisis event, wherein each of the known cases comprises attributes and at least one outcome;
    identifying a first subset of the known cases that relate to the identified patterns; and analyzing the patterns to determine a cue that, if answered, will provide a second subset of the known cases including a more converged range of decision outcomes than the first subset.

* * * * *